(12) United States Patent
Zarkhin

(10) Patent No.: US 9,735,674 B2
(45) Date of Patent: Aug. 15, 2017

(54) PWM GENERATION FOR DC/DC CONVERTERS WITH FREQUENCY SWITCHING

(71) Applicant: Continental Automotive Systems, US, Inc., Auburn Hills, MI (US)

(72) Inventor: Mikhail Zarkhin, West Bloomfield, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 194 days.

(21) Appl. No.: 14/089,955

(22) Filed: Nov. 26, 2013

(65) Prior Publication Data

US 2015/0145498 A1    May 28, 2015
US 2015/0256065 A9    Sep. 10, 2015

Related U.S. Application Data

(60) Provisional application No. 61/737,858, filed on Dec. 17, 2012.

(51) Int. Cl.
*H02M 3/156* (2006.01)
*H02M 3/155* (2006.01)

(52) U.S. Cl.
CPC .... *H02M 3/156* (2013.01); *H02M 2003/1557* (2013.01)

(58) Field of Classification Search
CPC .. H02M 3/156; H02M 3/1563; H02M 3/1566; H02M 3/157; H02M 3/158; H02M 3/1582; H02M 3/1588; H02M 3/1584; H02M 3/07; H02M 2003/1557; H02M 2001/0025; H02M 1/32; H02M 1/325; Y02B 70/1458; Y02B 70/1466; Y02B 70/16; H03K 4/06; H03K 4/00; H03K 7/08

USPC ........... 323/222–226, 267–276, 282–288, 323/299–303, 351, 242, 279, 326; 363/50–56.12, 123–127, 19, 21.01; 327/131–140, 172–177; 375/237–239
See application file for complete search history.

(56) References Cited

U.S. PATENT DOCUMENTS

| | | |
|---|---|---|
| 7,595,623 B2 * | 9/2009 | Bennett ..................... 323/288 |
| 2005/0116698 A1 * | 6/2005 | Prinz et al. ............... 323/283 |
| 2008/0224625 A1 * | 9/2008 | Greenfeld ......... H05B 33/0851 315/201 |

(Continued)

OTHER PUBLICATIONS

Non-Final Rejection for related U.S. Appl. No. 15/180,881, dated Jun. 16, 2017.

*Primary Examiner* — Gustavo Rosario Benitez
*Assistant Examiner* — Carlos Rivera-Perez

(57) ABSTRACT

A method for generating a pulse width modulation (PWM) control signal includes generating a sawtooth ramp signal at a first frequency under standard operating conditions using a ramp generator, generating a PWM square wave having a rising edge at a falling edge of the sawtooth ramp signal and a falling edge when the sawtooth ramp signal exceeds an error threshold, adjusting the frequency of the sawtooth ramp in response to a changed operating parameter of the ramp generator, and adjusting a peak input voltage of the ramp generator simultaneous with adjusting the frequency of the sawtooth ramp, thereby preventing one of a voltage overshoot and a voltage undershoot.

5 Claims, 3 Drawing Sheets

(56) References Cited

U.S. PATENT DOCUMENTS

2009/0237059 A1* 9/2009 Chiba ............................ 323/288
2011/0316511 A1* 12/2011 Wang et al. .................. 323/285

* cited by examiner

PWM GENERATION FOR DC/DC CONVERTERS WITH FREQUENCY SWITCHING

CROSS-REFERENCE TO RELATED APPLICATION

This application claims priority to U.S. provisional patent application 61/737,858, filed Dec. 17, 2012 and titled "PWM Generation for DC/DC Converters with Frequency Switching."

BACKGROUND OF THE INVENTION

The present disclosure relates generally to Pulse Width Modulation (PWM) controllers and more particularly to single-ended primary-inductance converters (SEPICs) including frequency switching functions for a PWM control signal.

(PWM) is widely used to control switch mode power supplies, such as the power supplies that are found in automotive systems. A typical approach used to generate PWM control signals uses a flip-flop, comparator and a ramp generator. At the beginning of each ramp up from the ramp generator, the output of the flip-flop is set to on, resulting in a high voltage output. The comparator resets the flip-flop to off when the output of the ramp generator exceeds a predefined threshold (when the ramp up exceeds the threshold). The threshold is defined by an error amplifier that is part of a feedback control loop within the control system or defined in a controller. This process repeats at a fixed frequency generating a square wave output from the flip-flop. The square wave output functions as the PWM control signal.

In some instances, the PWM frequency is adjusted to compensate for operating conditions of a DC/DC converter, such as a SEPIC, used as part of the aforementioned ramp generator. Operating conditions that can require this adjustment are sudden changes to the input voltage of the DC/DC converter, the output voltage of the DC/DC converter, a connected load, or any other similar operating condition.

One type of DC/DC converter that is frequently utilized in PWM systems is a single-ended primary-inductor converter (alternately referred to as a SEPIC). PWM SEPICs typically include a compensation loop design that keeps the system stable when the converter is operating in a discontinuous conduction mode. When the input voltage to the converter decreases below a predefined threshold, the operating frequency of the converter is decreased in order to keep a power stage of the SEPIC stable. If the peak and valley values of the sawtooth signal remain the same (i.e. the slope of the sawtooth is adjusted proportional to the ratio of frequencies) then the operating frequency change causes an overshoot or undershoot. Similarly, when the frequency is increased after the input voltage exceeds the predefined threshold, there is a corresponding undershoot at the SEPIC output voltage.

SUMMARY OF THE INVENTION

Disclosed is a method for generating a pulse width modulation (PWM) control signal including generating a sawtooth ramp signal at a first frequency under standard operating conditions using a ramp generator, generating a PWM square wave having a rising edge at a falling edge of the sawtooth ramp signal and a falling edge when the sawtooth ramp signal exceeds an error threshold, adjusting the frequency of the sawtooth ramp in response to a changed operating parameter of the ramp generator, and adjusting a peak input voltage of the ramp generator simultaneous with adjusting the frequency of the sawtooth ramp, thereby preventing one of a voltage overshoot and a voltage undershoot.

Also disclosed is a pulse width modulation (PWM) signal generator circuit having a voltage source, a control circuit operable to receive input power from the voltage source and operable to generate a sawtooth voltage ramp signal using a ramp generator, an oscillator connected to the ramp generator such that the oscillator controls a frequency of a sawtooth ramp generated by the ramp generator, an error amplifier operable to set an error voltage threshold, a comparator connected to an output of the ramp generator and an output of the error amplifier such that the comparator compares the output of the ramp generator against the output of the error amplifier, a flip flop connected to the output of the comparator and operable to output a PWM control signal, and the control circuit is operable to adjust a frequency of the ramp generator in response to a changed operating state of a power stage, the control circuit including a memory storing instructions operable to cause the control circuit to adjust a peak sawtooth voltage of the control circuit simultaneously with the frequency adjustment.

These and other features of the present invention can be best understood from the following specification and drawings, the following of which is a brief description.

DETAILED DESCRIPTION OF AN EMBODIMENT

Figure 1:
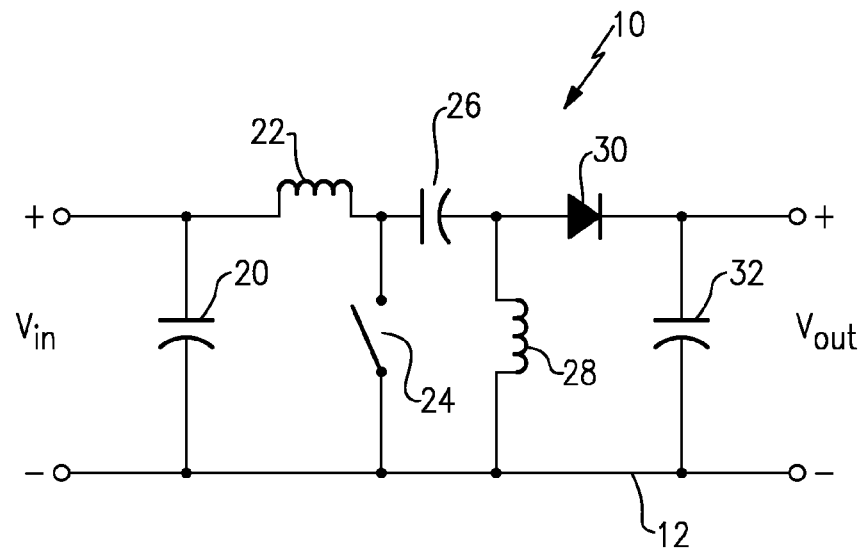
FIG. 1 schematically illustrates a single-ended primary-inductance converter (SEPIC).

FIG. 1 schematically illustrates a power stage 10 that operates as a DC/DC converter. The power stage 10 includes an input voltage $V_{in}$ and an output voltage $V_{out}$. Parallel to the input voltage $V_{in}$ is a capacitor 20. An inductor 22 is connected to a positive terminal of the capacitor 20, and to a positive terminal of a switch 24. The switch 24 connects the first inductor 22 to a negative voltage return line 12. A second capacitor 26 is connected at one end to the first inductor 22, and at a second end to a second inductor 28. The second end of the second inductor 28 is connected to the negative voltage return line 12. A cathode end of a diode 30 is connected to the node joining the second capacitor 26 and the second inductor 28. A third capacitor 32 connects the anode end of the diode 30 to the negative voltage return line 12. The third capacitor 32 is parallel to an output voltage $V_{out}$ of the power stage 10.

Figure 2:
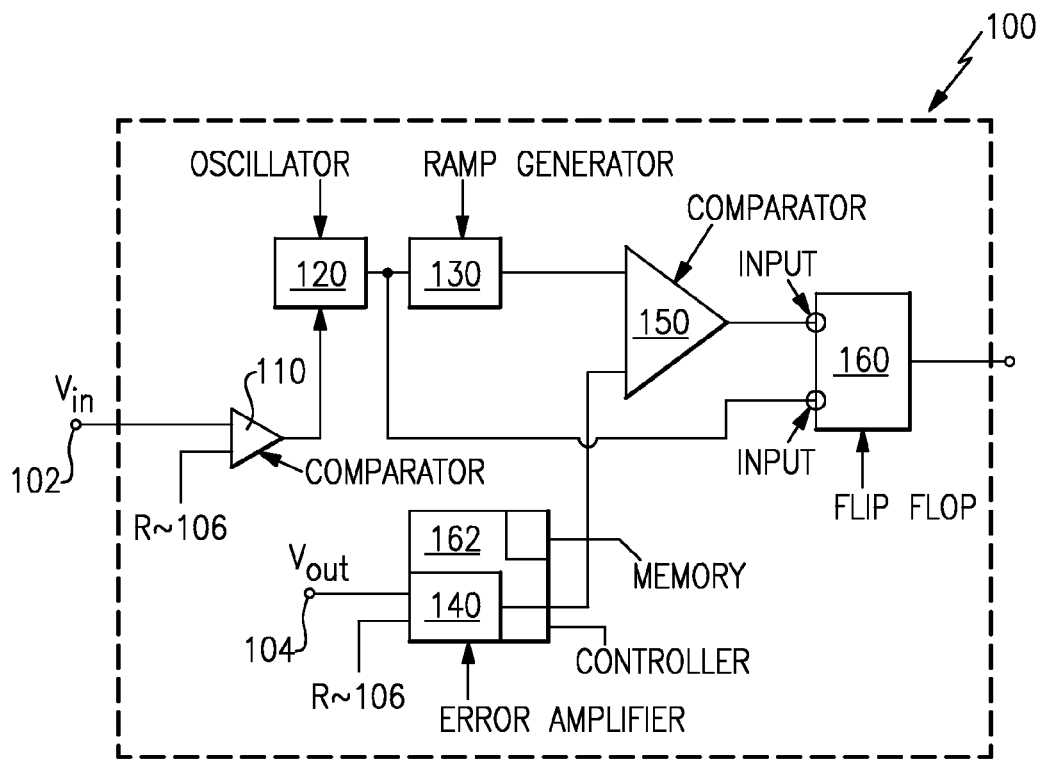
FIG. 2 schematically illustrates an application specific integrated circuit (ASIC) for a PWM generator including a SEPIC.

In a typical power stage, the power stage is connected to and controlled by an Application Specific Integrated Circuit (ASIC). FIG. 2 illustrates an example ASIC 100 for controlling a power stage. The ASIC 100 includes a first voltage input 102 connected to a voltage source, a second voltage input 104 connected to an output voltage ($V_{out}$) of the power stage, and a reference voltage input 106. The first voltage input 102 is compared to the reference voltage 106 in a comparator 110, and the output of the comparator 110 controls an oscillator 120. The oscillator output is passed to a ramp generator 130 that generates a sawtooth ramp.

The second voltage input 104 ($V_{out}$) is connected to an error amplifier 140 that sets an error voltage ($V_e$) threshold. The error amplifier 140 compares $V_{out}$ to the reference voltage 106 and magnifies the error between the values according to a known gain. In the illustrated example, a single reference voltage 106 is utilized for the ASIC 100, however in alternate examples the reference voltages 106 can be distinct voltage levels and are connected to distinct reference voltage sources.

The output of the error amplifier 140 and the output of the ramp generator 130 are passed to a comparator 150 that determines when the output of the ramp generator exceeds the error voltage ($V_e$) threshold set by the error amplifier 140. The output of the comparator 150 and the output of the oscillator 120 are passed to a flip flop 160. The flip flop 160 operates in conjunction with the ramp generator 130 to output a PWM signal for controlling the power stage.

In the illustrated examples of FIGS. 1 and 2, whenever the input voltage $V_{in}$ decreases below a predefined threshold, the operating frequency of the power stage 10, 110 is decreased by the controller 162. This frequency adjustment maintains the power stage 10, 110 in a discontinuous mode of operations. The sawtooth voltage $V_{saw}$ of the power stage 10, 110 changes in this manner whenever an abrupt change in the system input voltage occurs. These types of abrupt changes are frequent in automotive systems.

Figure 3:
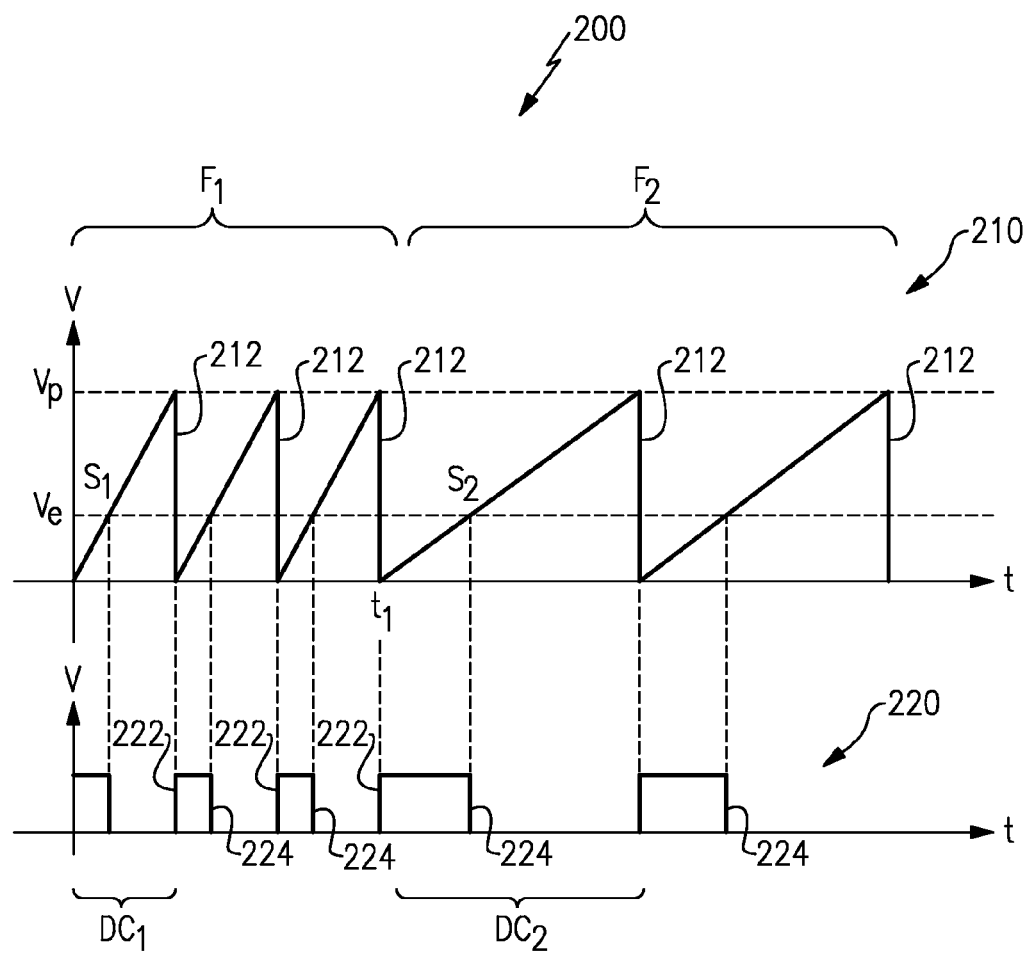
FIG. 3 schematically illustrates a plot of a sawtooth ramp signal and a corresponding PWM output signal maintaining a constant peak input voltage.

FIG. 3 illustrates a chart 200 showing an internal sawtooth ramp voltage 210 and a PWM control signal output 220 of the ASIC 100 of FIG. 2. The chart 200 reflects a decrease in the operating frequency at time $t_1$ resulting from an abrupt SEPIC input change. In response to the SEPIC input change, the operating frequency of the SEPIC 110 is adjusted by the controller 162 from a first frequency (F1) to a second, lower frequency (F2) at time $t_1$ by a given factor ("K") in order to maintain the power stage in discontinuous mode. The given factor "K" is F1/F2. As the slope S1, S2 of the sawtooth ramp is a function of the frequency F1, F2 and the peak sawtooth voltage, the slope S1 of the sawtooth ramp is similarly adjusted to a new slope S2 when the frequency changes. The new ramp slope S2 is equal to the old ramp slope S1 divided by the factor K (S1/K). Thus if the original operating frequency F1 is doubled (adjusted by a factor of 2) at time $t_1$, the new slope S2 of the sawtooth ramp is ½ of the previous slope S1.

The ASIC 100 generates a square wave pulse signal with a rising edge 222 of the square wave triggered by the falling edge 212 of the sawtooth waveform 210. The falling edge 224 of the square wave pulse signal is triggered by the sawtooth waveform 210 exceeding a pre-defined error voltage threshold $V_e$. The error voltage threshold $V_e$ is set using any known means. In some examples the error voltage threshold $V_e$ is set via the use of an error amplifier circuit incorporated into the controller 162 of the ASIC 100.

Assuming that the error voltage threshold $V_e$ is not changed when the operating frequency shifts from the first operating frequency F1 to the second operating frequency F2, maintaining a constant sawtooth voltage $V_{saw}$ causes the duty cycle DC1 of the PWM signal at the first frequency F1 and the duty cycle DC2 of the PWM signal at the second frequency to remain the same. As is understood by those of skill in the art of PWM controls, the duty cycle of a PWM signal is the percentage of each period that the square wave, or pulse, is high. The equality of the duty cycles DC1, DC2 and the alteration of the slopes S1, S2 in the above described system causes the output voltage to overshoot when the SEPIC switches to a lower operating frequency and the output voltage to undershoot when the SEPIC switches to a higher operating frequency.

In SEPIC converters operating in discontinuous mode, such as the SEPIC converters illustrated in FIGS. 1 and 2, the duty cycle is defined not only by the input voltage $V_{in}$ and the output voltage $V_{out}$, but also by converter output power. During steady state operations, the SEPIC output power combined with efficiency losses should be equal to the SEPIC input power. When the SEPIC output power does not equal the SEPIC input power minus efficiency losses, then the SEPIC is not in steady state operations. A prime example of such a condition is during either a voltage undershoot or a voltage overshoot.

When the sawtooth voltage $V_{saw}$ is fixed, such as in the previously described SEPIC, the input cycle energy is proportional to the second power of the ON time of the PWM signal (i.e., the second power of the duty cycle DC1, DC2). The converter output power is the product of the output cycle energy and the operating frequency of the power stage. When the operating frequency changes from F1 to F2 by a factor of K, the output cycle energy also changes by a factor of K, but in the reverse direction. For example, if the second frequency F2 is twice the first frequency F1, then the output cycle energy is halved during the second frequency F2 operations.

With the above understanding, it can be appreciated that when the duty cycle DC2 at the second frequency is equal to the duty cycle DC1 at the first frequency, then the ON time and the peak current of the power stage, 110 also changes by a factor of K. This, in turn, causes the input cycle energy to be changed by a factor of K*K. Thus, when the frequency is decreased, the input cycle energy is increased in excess of what is necessary to maintain the output power. This results in a voltage overshoot for the duration of time required for the feedback loop within the ASIC 100 to decrease the duty cycle to compensate for the increase and the new sawtooth voltage $V_{saw}$.

It is further appreciated that maintaining a constant duty cycle within a PWM signal is not a requirement for achieving proper PWM controls. In the illustrated ASIC 100 of FIG. 2, and power stage 10 of FIG. 1, the ASIC 100 prevents voltage undershoots and overshoots during this duration by adjusting the peak voltage of the sawtooth ramp using the controller 162. Adjusting the peak input voltage of the SEPIC 110 simultaneous with adjusting the input frequency F1, F2 at $t_1$ prevents the slope of the sawtooth ramp during the second frequency F2 operations from being increased by the factor K, and instead adjusts the slope by a different factor dependent upon the new slope S2.

Figure 4:
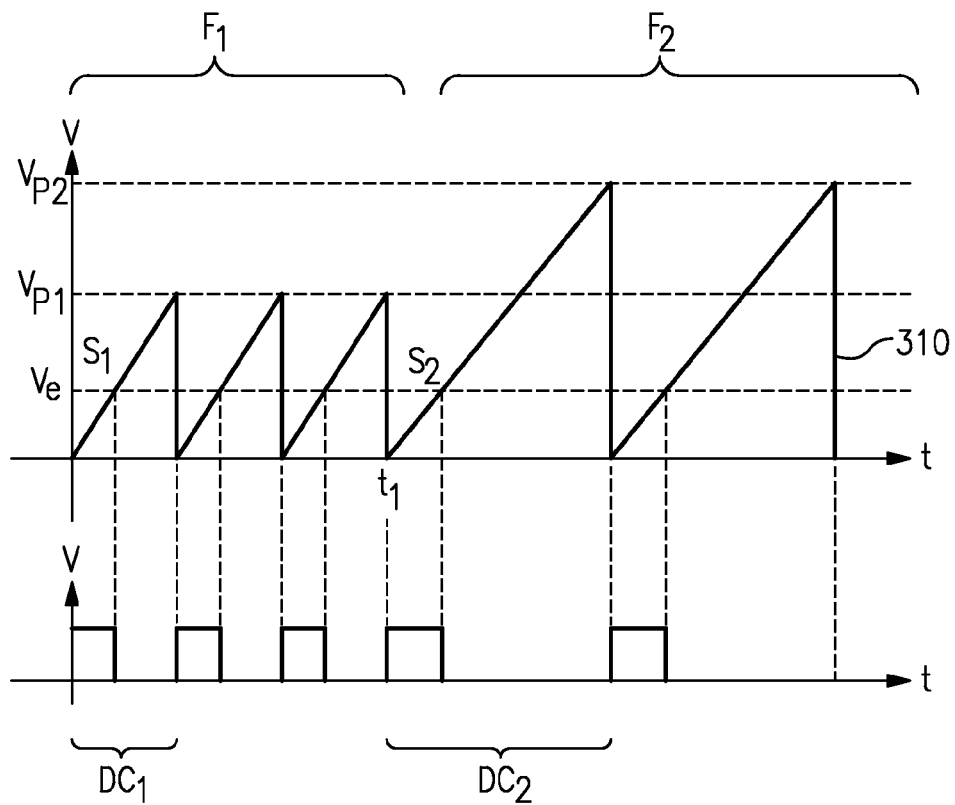
FIG. 4 illustrates a plot of a sawtooth ramp signal and a corresponding PWM output signal including adjustments on peak input voltage.

FIG. 4 illustrates a plot of the sawtooth ramp signal and a corresponding PWM output signal including peak input voltage adjustments made by the controller 162. Unlike the PWM generation scheme illustrated in FIG. 3, when the controller 162 adjusts the frequency of the sawtooth ramp signal 310, the peak input voltage of the SEPIC 110 is adjusted from an initial peak sawtooth voltage $V_{p1}$ corresponding to the first operating frequency F1 to a second peak sawtooth voltage $V_{p2}$ corresponding to the second operating frequency F2. By increasing the peak sawtooth voltage $V_{p1}$, $V_{p2}$ alongside a decrease in the frequency F2, the decrease in the slope of the sawtooth ramp between the first frequency and the second frequency is a factor of the square root of the factor K by which the frequency was adjusted (i.e., sqrt(K)) instead of being decreased by a factor of K.

In order to achieve the smaller decrease in ramp slope S1, S2 described above, the peak sawtooth voltage is also increased by a factor of the square root of the factor K by which the frequency was adjusted. In other words, $V_{p2}=V_{p1}*sqrt(K)$, where $V_{P2}$ is the new peak sawtooth voltage, $V_{p1}$ is the original peak sawtooth voltage, and K is the factor by which the frequency is adjusted from the first frequency F1 to the second frequency F2. The increased peak sawtooth voltage $V_{p2}$ causes the new ramp slope S2 to be the previous ramp slope S1 divided by the square root of K.

As a further result of changing the peak sawtooth voltage, the duty cycle of the PWM signal is also changed, and is not maintained constant between the first frequency F1 and the second frequency F2. The new duty cycle of the PWM signal at the second frequency F2 is equal to the duty cycle of the PWM signal at the first frequency F1 multiplied by the square root of the factor K. The utilization of multiple varied duty cycles within a single PWM signal is known in the art, and the adjusted duty cycle does not degrade the performance of the PWM signal.

As described above, when the ON time of the PWM signal and the peak current of the SEPIC changes by a factor of K, the resultant input cycle energy is changed by a factor of K*K. By adjusting the peak sawtooth voltage $V_{p1}$, $V_{p2}$ in the manner described above, however, the ON time of the PWM signal (the duty cycle DC1, DC2) is adjusted by a factor of the square root of K, and the peak current (which is directly proportional to the peak input voltage) is similarly adjusted by a factor of the square root of K. These adjustments result in the input cycle energy being adjusted by a factor of Sqrt(K)*Sqrt(k). Sqrt(K)*Sqrt(K)=K. Therefore, adjusting the peak sawtooth voltage $V_{p1}$, $V_{p2}$ in the above described manner causes the input cycle energy to change by a factor of K, instead of a factor of K squared. This corrected adjustment maintains the steady state operations of the SEPIC and eliminates output voltage overshoot or undershoot when the operating frequency of the SEPIC is changed.

Figure 5:
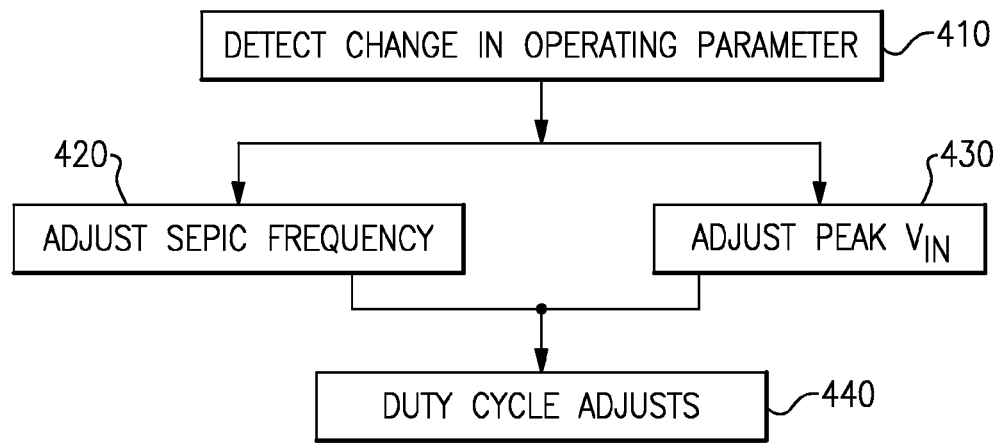
FIG. 5 illustrates a flowchart of a practical operation of a SEPIC.

With continued reference to FIG. 2, and with like numerals indicating like elements, described below, and illustrated in FIG. 5, is a practical operation of the SEPIC 110, when the SEPIC 110 undergoes a frequency adjustment. Initially, a sharp change in an operating parameter of the SEPIC 110, such as a decrease in available input voltage in a "detect change in operating parameter" step. Upon detection of the sharp increase in the input voltage the controller 162 compensates for the decreased available input voltage by adjusting the frequency of the SEPIC 110 to have a longer period in an "Adjust SEPIC Frequency" step 420. Simultaneous with adjusting the SEPIC frequency, the controller 162 adjusts the peak sawtooth voltage $V_{saw}$ allowed into the SEPIC 110 thereby allowing the sawtooth ramp generated to exceed the original peak sawtooth voltage value $V_{saw}$, in an "Adjust Peak $V_{in}$," step 430. As described above, the new sawtooth peak $V_{saw}$ is increased by a factor of the square root of the factor by which the frequency was increased.

As a result of the increased frequency and the increased peak sawtooth voltage $V_{in}$, the duty cycle of the pulse signal generated by the flip-flop 140 and the comparator 150 self adjusts in a "Duty Cycle Adjusts" step 440. The amount of the duty cycle adjustment depends on both the SEPIC frequency adjustment and the peak sawtooth voltage $V_{saw}$ adjustment. As the peak sawtooth voltage $V_{saw}$ is adjusted by the square root of the factor by which the SEPIC frequency is adjusted, the Duty Cycle is also adjusted by the square root of the factor by which the SEPIC frequency was adjusted.

Because the duty cycle self adjusts corresponding to the adjusted SEPIC frequency and the peak sawtooth voltage $V_{saw}$, overshoots and undershoots of the output voltage are prevented and the SEPIC converter is maintained in the discontinuous mode.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for generating a pulse width modulation (PWM) control signal comprising the steps of:
   generating a sawtooth ramp signal at a first frequency having a first ramp slope under standard operating conditions using a ramp generator, the ramp generator utilizing a single-ended primary inductance converter (SEPIC) operating in discontinuous mode;
   generating a PWM square wave having a rising edge at a falling edge of the sawtooth ramp signal and a falling edge when said sawtooth ramp signal exceeds an error threshold;
   adjusting the first frequency of the sawtooth ramp signal to a second frequency having a second ramp slope by a first factor in a first direction, which first direction is either decreasing or increasing, in response to a changed operating parameter of the ramp generator, the first factor being a ratio of the first frequency to the second frequency, the second ramp slope being the first ramp slope divided by a square root of the first factor; and
   adjusting a peak sawtooth voltage of the ramp generator by a second factor in a second direction, the second factor being the square root of the first factor, and the second direction being opposite of the first direction, simultaneous with adjusting the first frequency of the sawtooth ramp signal to the second frequency, such that a duty cycle of the PWM square wave is adjusted by the second factor in the second direction, thereby preventing one of a voltage overshoot and a voltage undershoot.

2. The method of claim 1, wherein the changing operating parameter of the ramp generator is at least one of an increase in a load, a decrease in a load, and a decrease in an available input power.

3. The method of claim 1, wherein maintaining the SEPIC converter in the discontinuous mode is achieved by utilizing a compensation loop.

4. A pulse width modulation (PWM) signal generator circuit comprising:
   a voltage source;
   a control circuit operable to receive input power from said voltage source and operable to generate a sawtooth voltage ramp signal at a first frequency having a first ramp slope using a ramp generator, the ramp generator utilizing a single-ended primary-inductance converter (SEPIC) configured to operate in discontinuous mode;

an oscillator connected to the ramp generator such that said oscillator controls the first frequency of the sawtooth voltage ramp signal generated by the ramp generator;

an error amplifier operable to set an error voltage threshold;

a comparator connected to an output of the ramp generator and an output of the error amplifier such that said comparator compares the output of the ramp generator against the output of the error amplifier;

a flip-flop connected to the output of the comparator and operable to output a PWM control signal;

wherein the control circuit is operable to adjust the first frequency of the sawtooth voltage ramp signal of the ramp generator to a second frequency having a second ramp slope in response to a changed operating state of a power stage, the control circuit including a memory storing instructions operable to cause the control circuit to adjust a peak sawtooth voltage of the control circuit simultaneously with the frequency adjustment; and wherein said control circuit is operable to adjust the peak sawtooth voltage of the ramp generator by a first factor in a first direction, which first direction is either decreasing or increasing, and wherein said control circuit is operable to adjust the first frequency of the sawtooth voltage ramp signal of the ramp generator to a second frequency by a second factor in a second direction, wherein the first factor is a square root of the second factor, and the second direction is opposite of the first direction, and wherein a duty cycle of a generated PWM signal is adjusted by the first factor in the first direction simultaneous with the frequency adjustment, the second factor being a ratio of the first frequency to the second frequency, and the second ramp slope being the first ramp slope divided by the square root of the second factor.

5. The PWM signal generator circuit of claim 4, wherein each of said oscillator, comparator, error amplifier and said flip-flop are components of an application specific integrated circuit (ASIC).

* * * * *